United States Patent [19]

Kirschner

[11] 4,445,077
[45] Apr. 24, 1984

[54] DRIVE CIRCUIT FOR STEP MOTOR

[75] Inventor: Klaus P. Kirschner, Nuremberg, Fed. Rep. of Germany

[73] Assignee: Philips Kommunikations Industrie AG, Nuremberg, Fed. Rep. of Germany

[21] Appl. No.: 342,648

[22] Filed: Jan. 25, 1982

[51] Int. Cl.³ .............................................. H02K 29/02
[52] U.S. Cl. ................................... 318/696; 318/685; 318/345 C; 318/345 G
[58] Field of Search ............... 318/138, 345 C, 345 G, 318/696, 685

[56] References Cited

U.S. PATENT DOCUMENTS 3,365,636  1/1968  Baker .................................. 318/138
3,555,389  1/1971  Opal ................................ 318/345 G
3,845,379  10/1974  Kawamata et al. ............. 318/345 C Primary Examiner—G. Z. Rubinson
Assistant Examiner—Saul M. Bergmann
Attorney, Agent, or Firm—Horst M. Kasper

[57] ABSTRACT

A drive circuit for a step motor, where the stator windings of the step motor are in each case connected in series to a diode and where a capacitor is connected in parallel to the series of diode and winding. The above element is provided with power from a d.c. source via a thyristor switch. The circuit provides that upon firing of a thyristor the previously current conducting thyristor is switched off. Thus step motors can reliably be operated, where up to the switching to another winding still a holding current is to flow.

3 Claims, 1 Drawing Figure

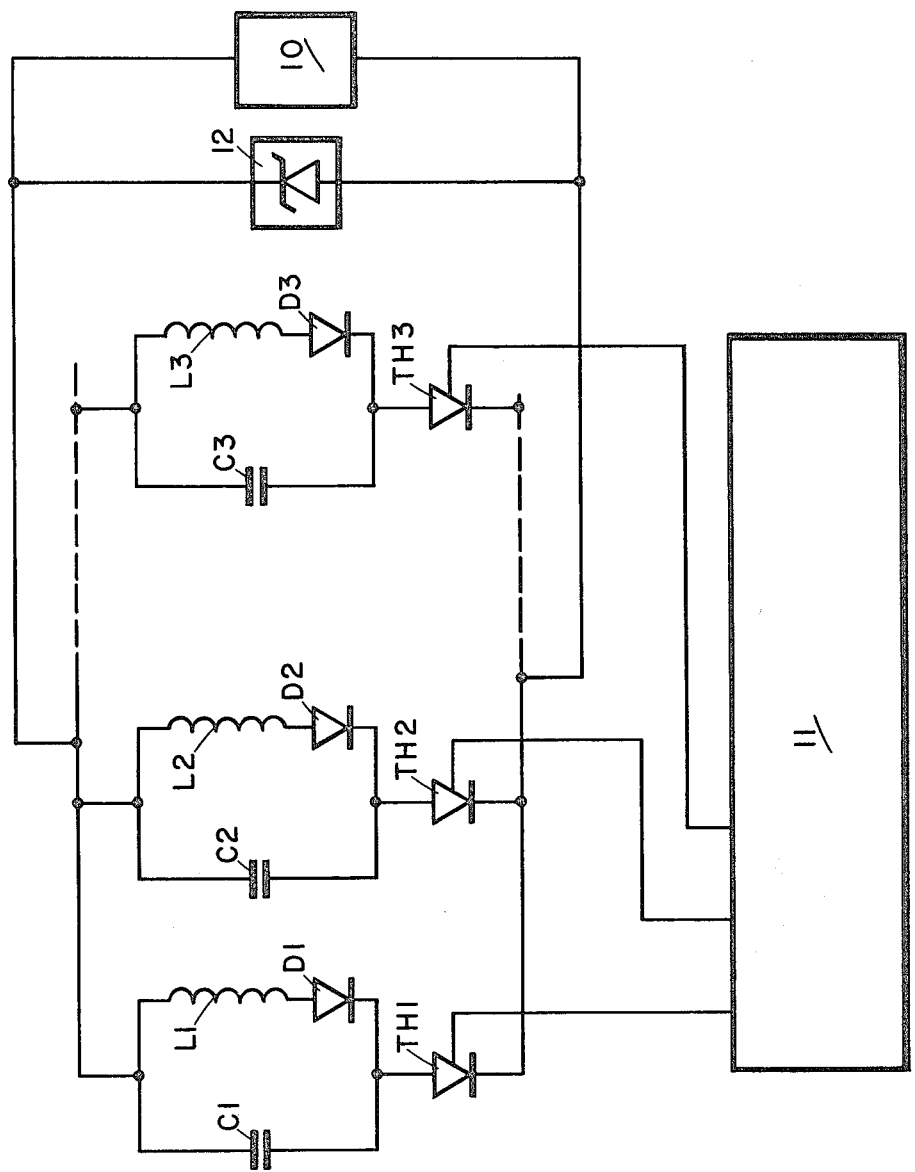

DRIVE CIRCUIT FOR STEP MOTOR

BACKGROUND OF THE INVENTION

1. Field of the Invention

The present invention relates to a drive circuit for a step motor employing thyristors.

2. Brief Description of the Background of the Invention Including Prior Art

The application of a step motor with a relatively low self holding torque results in the advantage of a correspondingly low energy requirement for performing each step. For avoiding of undesired motions caused by mechanical disturbances such as for example small shocks the self holding torque can be supported by an additional magnetic field, which can be generated from a current flowing in the rest position in a stator winding.

The switching on of the stator windings is performed by way of thyristors connected in series, where the conducting state of the thyristors is maintained in each case by the current flowing through them. In the context of the present invention a thyristor refers generically to thyratronlike solid-state devices such as silicon controlled rectifiers and in particular pnpn-type bistable semiconductor devices having anode, cathode and gate terminals and useable as an electronic switch.

For switching off of a stator winding the corresponding thyristor has to be switched off and in general a special quench device has to be provided for this purpose. It is an advantage, if the switching on step of another stator winding can be employed for at the same time quenching said thyristor to switch off the current flow.

SUMMARY OF THE INVENTION

Purposes of the Invention

It is an object of the present invention to provide a particularly simple drive circuit employing thyristors for a step motor, where a current flowing through a stator winding of the step motor is switched off as rapidly as possible and under low losses and another winding is switched on.

It is another object of the present invention to provide a drive circuit for a step motor where a thyristor of a winding to be switched on effects quenching the previously conducting thyristor.

It is a further object of the present invention to employ a capacitor for accepting the energy remaining in the winding after switching off of the corresponding thyristor.

These and other features and advantages of the present invention will become evident from the description which follows.

Brief Description of the Invention

The present invention provides a drive circuit for a step motor which comprises diodes each connected in series to a corresponding winding of the step motor, capacitors each connected in parallel to a corresponding series of a diode connected to a winding and the capacitor also being connected on one side to one terminal of a d.c. current source, thyristors each connected to a corresponding capacitor on the side not connected to the current source and also connected to the second terminal of the current source, and a control device connected to the gate inputs of the thyristors. A surge protection device can be connected in parallel to the current source.

There is also provided a method for energizing a step motor which comprises energizing the winding with current, charging a capacitor connected in parallel to the series of winding and diode while the winding is energized, interrupting the current flow by instituting a corresponding cycle at a second winding, charging with reverse polarity the capacitor with the energy remaining in the switched off winding and preventing current flow in the opposite direction by connecting a diode in series with the corresponding winding.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing in which is shown one of the various possible embodiments of the present invention, FIG. 1 is a view of a schematic diagram of a drive circuit for a step motor according to the present invention.

DESCRIPTION OF INVENTION AND PREFERRED EMBODIMENTS

In accordance with the present invention there is provided a drive circuit where in series to each stator winding there is connected a diode in each case and where in parallel to each of said series connection there is connected a capacitor in each case. Thyristors (Th1, Th2, Th3) are connected in series to the windings (L1, L2, L3), the diodes (D1, D2, D3) and the capacitors (C1, C2, C3) in each case. Such a drive circuit can advantageously be employed for driving a step motor operating a printer for teletype equipment or for other printing machines.

For reasons of simplifying the representation in the drawing only three windings L1, L2, and L3 are shown of the step motor. The dashed lines indicate in FIG. 1, that the motor employed in each case can be provided with a larger number of windings. Since also the spacial arrangement of the windings with respect to each other does not have an immediate influence on the functioning of the circuit shown, also the possibility of employing this drive circuit in other types of motors exists, e.g. linear motors.

Also, the movable element of such motor not shown here takes a position corresponding to the windings controlled in each case. The movable element is in general a rotor and the magnetic field of a current containing winding interacts with the rotor.

The windings L1, L2, L3 can be connected to the power supply 10 via corresponding in series disposed thyristors Th1, Th2, Th3. A constant current source serves as a power supply. In order to avoid damaging overvoltages at the output terminals of the constant current source a surge protector 12 is provided in FIG. 1. The switching pulses for the gate electrodes of the thyristors Th1, Th2, and Th3 are generated by the control device 11.

The diodes D1, D2, D3 are connected in series with the windings L1, L2, L3. The capacitors C1, C2, C3 are connected in each case parallel to the resulting series connections.

Upon switching on of the circuit the voltage generated by the constant current source 10 is initially limited to the value predetermined by the surge protector 12, since in the connected circuit no closed circuit paths are present for the current as long as the thyristors Th1, Th2, and Th3 are switched off. Initially the capacitors C1, C2 and C3 are in a discharged state.

The thyristor Th2 is switched on if the rotor is to be brought in the position determined by the magnetic field of the winding L2. The current flows via this thyristor Th2 into the capacitor C2, such that the voltage of the constant current source 10 collapses. With increasing charge on the capacitor C2 the voltage increases again.

If the voltage surpasses the threshold voltage of the diode D2, then additional current flows via the winding L2 of the step motor disposed in parallel to the capacitor C2. Since the winding L2 cannot initially accept the current in total, the capacitor C2 further accepts the current difference between the current coming from the constant current source 10 and the momentary value of the current passing through the winding L2, until the winding L2 has completely accepted all the current coming from the constant current source 10. The desired motion is now provided by the magnetic field generated by the winding L2.

Furthermore, in addition the current through the winding L2 flows via the switched on thyristor Th2 and generates the desired holding moment.

If now the thyristor Th1 is switched on, then the current flows through the capacitor C1 still being in a discharged state, as a result of which the voltage at the constant current source collapses and blocks the thyristor Th2. In the circuit belonging to the thyristor Th1 the process described above for the circuit of the thyristor Th2 now runs and generates in the winding L1 the desired magnetic field.

By blocking the thyristor Th2 the outer connection of the current circuit for the winding L2 is interrupted. However, the current in the winding L2 remains effective in the original direction and flows now to the capacitor C2, whereby the capacitor C2 is charged with reverse polarity. Backflow of the charge from the capacitor C2 into the winding L2 is prevented by the diode D2, such that the charge state generated this way remains effective until a renewed firing of the thyristor Th2. Thereby, the thyristor Th2 is safely kept in a blocking state for the current.

If now the thyristor Th2 is again fired, then the voltage at the capacitor C2 acts as a countervoltage to which the voltage of the constant current source 10 falls such that the previously fired thyristor Th1 blocks rapidly and reliably.

It is to be understood that each of the elements described above, or two or more togther, may also find a useful application in other types of motor configurations and electromechanical power converters differing from the types described above.

While the invention has been illustrated and described in the context of a step motor, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A drive circuit for a step motor comprising
   a constant current power supply;
   stator windings of the step motor;
   diodes each connected in series to a corresponding winding; capacitors each connected in parallel to a corresponding series of a diode connected to the winding and also connected on one side to one terminal of the constant current power supply;
   thyristors each connected to a corresponding capacitor on the side not connected to the constant current power supply and connected to the second terminal of the constant current power supply; and
   a control device connected to the gate inputs of the thyristors.

2. The drive circuit for a step motor according to claim 1 further comprising a surge protector connected in parallel to the constant current power supply.

3. A method for providing power to a step motor comprising
   charging a capacitor;
   energizing a winding connected in series to a diode with the series connection of the diode and the winding being in parallel to the capacitor;
   interrupting the current flow by instituting a corresponding cycle at a second winding; and
   charging with reverse polarity the capacitor with the energy remaining in the switched off winding and preventing current flow in the opposite direction by connecting a diode in series to the corresponding winding.

* * * * *